(12) United States Patent
Oki et al.

(10) Patent No.: US 6,811,597 B2
(45) Date of Patent: *Nov. 2, 2004

(54) INK COMPOSITION, RECORDING MEDIUM, INKJET RECORDING METHOD, AND RECORDING

(75) Inventors: Yasuhiro Oki, Nagano-ken (JP); Kazuhiko Kitamura, Nagano-ken (JP); Tetsuya Aoyama, Nagano-ken (JP); Kyoichi Oka, Nagano-ken (JP); Nobuo Uotani, Chiba-ken (JP); Hiroshi Takahashi, Chiba-ken (JP); Yuji Ito, Chiba-ken (JP)

(73) Assignee: Seiko Epson Corporation, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 10/103,661

(22) Filed: Mar. 21, 2002

(65) Prior Publication Data

US 2002/0185036 A1 Dec. 12, 2002

(30) Foreign Application Priority Data

Mar. 30, 2001 (JP) ........................................ 2001-102700

(51) Int. Cl.[7] .............................. C09D 11/00; B41J 2/01; B32B 3/00; B32B 27/14
(52) U.S. Cl. ................................ 106/31.46; 106/31.47; 106/31.49; 106/31.43; 106/31.76; 106/31.77; 106/31.78; 106/31.79; 428/32.1; 347/100; 283/45
(58) Field of Search .......................... 106/31.46, 31.47, 106/31.49, 31.43, 31.76, 31.77, 31.78, 31.79, 31.75; 428/32.1; 347/100; 283/45

(56) References Cited

U.S. PATENT DOCUMENTS 5,205,861 A * 4/1993 Matrick ...................... 524/101
6,436,178 B1 * 8/2002 Hosmer .................... 106/31.46
6,582,501 B2 * 6/2003 Ryu et al. ................. 106/31.46
2002/0050226 A1 * 5/2002 Oki et al. ................. 106/31.46
2002/0185036 A1 * 12/2002 Oki et al. ................. 106/31.46
2003/0070582 A1 * 4/2003 Kitamura et al. ......... 106/31.46

FOREIGN PATENT DOCUMENTS

EP 000909798 A1 * 4/1999
JP 11170686 6/1999

OTHER PUBLICATIONS

English translation of JP11.170686, Jun. 1999.*

Patent Abstracts of Japan Publication No. 11–170686 dated Jun. 29, 1999.

* cited by examiner

Primary Examiner—Helene Klemanski
(74) Attorney, Agent, or Firm—Ladas & Parry

(57) ABSTRACT

An ink composition and/or a recording medium are made to contain a compound expressed by general formula (1) and a hydrazide compound. An ink composition thereby obtained does not clog and the ink composition and recording medium thus obtained can offer high quality images that hardly cause yellowing of the resulting recording with superior light resistance. Recording and an inkjet recording method pertaining thereto are also provided. The compound of general formula (1) is:

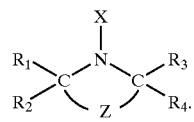

35 Claims, No Drawings

INK COMPOSITION, RECORDING MEDIUM, INKJET RECORDING METHOD, AND RECORDING

TECHNICAL FIELD

The present invention relates to an ink composition, recording medium, inkjet recording method, and recording, and more particularly to an ink composition, recording medium, and inkjet recording method that can obtain high quality images, and that have a recording with superior light stability (light resistance), ink that does not clog, and a recording with superior yellowing resistance.

BACKGROUND ART

Inkjet recording is a printing method that records by releasing droplets of an ink composition, and allows them to affix to a recording medium such as paper. This method is capable of printing high resolution, high quality images at high speed using comparatively inexpensive equipment.

A great variety of ink compositions have long been offered for use in this kind of inkjet recording.

Recently, there has been heightening demand to improve the weather resistance (particularly the light resistance) of the recorded image. The technique to achieve this end has been to include light stabilizers such as hindered amine group compositions to the ink composition.

For example, described in Dyes and Pigments 19 (Dyes and Pigments 19, 1992, 235–247) is the ability to prevent the light degradation of dyes by adding 2,2,6,6-tetramethyl-4-hydroxypiperidene-1-oxyl, which is a hindered amine group light stabilizer, to an aqueous solution containing said dye. Moreover, disclosed in Japan Unexamined Patent Disclosure No. Hei 11-170686, which was submitted after publication of the aforementioned cited literature (Dyes and Pigments 19), is technology that strives to stabilize said water soluble dye by adding a specific compound (the aforementioned 2,2,6,6-tetramethyl-4-hydroxypiperidene-1-oxyl or derivatives thereof). Said compound works to prevent light degradation by stopping the progress of the photo-oxide reaction of the pigment based on capturing radicals such as the R produced by photo-excitation of carbonyl compounds, etc. (alkyl radical) and the ROO produced by the reaction of R with the oxygen present in air (peroxide radical). The print recorded by the ink jet method using the above recording solution has superior light resistance.

Nonetheless, while the light resistance of the recorded image is improved by recording using an ink composition that contains the aforementioned light stabilizer, the new problem emerges that the recording yellows based on the affect of the light stabilizer when the recording is stored in a file composed of a film comprising oxidation preventatives consisting in specific phenol group derivatives, and when the applicable film is affixed to the recording.

This appears to be caused by a reaction of the specific phenol group derivatives based on the action of the light stabilizer, such as a hindered amine group compound contained within the ink composition adhering to the recording medium. BHT (2,6-di-t-butyl-4-methyl phenol), etc. are specific phenol group derivatives.

Specifically, the aforementioned phenol group derivatives contained in the film move from the film to the recording because they have sublimability, and it appears that the reactant produced through dimerization and a quinone reaction causes the recording to yellow based on the action of the light stabilizer in the recording. It appears that, if the light stabilizer has an oxy radical in particular, yellowing is produced all the more because the reaction is notably promoted.

In addition, even if a light stabilizer compound does not have an oxy radical, the yellowing reaction quietly progresses during the process of storing the recording in contact with air, and yellowing of the recording is still generated because oxy radicals are produced in the light stabilizer by oxidation reactions.

Consequently, an object of the present invention is to provide an ink composition, recording medium, inkjet recording method, and recording that can obtain high quality images with hardly any yellowing, and that have a recording with superior light resistance, and ink that does not clog.

DISCLOSURE OF THE INVENTION

As a result of painstaking inquiry, the present inventors discovered that a recording with superior light resistance, anti-clogging characteristics, and yellowing resistance could be obtained by configuring an ink composition to comprise a colorant, water, a compound expressed by the aforementioned general formula (1), and a hydrazide group compound.

The hydrazide compound in the present invention has a —CXNHNR$^8$R$^9$ group (R$^8$ and R$^9$ are hydrogen, an alkyl group, or an aryl group; X is S or O) or a —SO$_2$NHNR$^8$R$^9$ group (R$^8$ and R$^9$ are hydrogen, an alkyl group, or an aryl group), obtained by a condensation reaction of hydrazine compounds expressed by the general formula NH$_2$NR$^8$R$^9$ (R$^8$ and R$^9$ are hydrogen, an alkyl group, or an aryl group) with: a related acid derivative such as an ester of carbonate, acid halide, or thiocarbonate; a sulfonate derivative such as sulfonate, or chlorosulfonate; or isocyanate or diisocyanate.

In addition, the present inventors discovered that a recording with superior light resistance and yellowing resistance could be obtained by providing a recording medium with a receiving layer, and by said receiving layer comprising a compound expressed by aforementioned general formula (1), and a hydrazide group compound.

The present invention is based on the aforementioned discovery; offers an ink composition that comprises a compound expressed by aforementioned general formula (1) and a hydrazide group compound; and offers a recording medium that has a receiving layer comprising a compound expressed by aforementioned general formula (1), and a hydrazide group compound. The present invention further offers a recording and a recording method obtained by using these ink compositions and/or recording media.

In the above, the compound expressed by general formula (1) preferably has a water soluble group W (W expresses a hydroxide group, —SO$_3$H group, sulfate ester group, —P(O)(OH)(OR), —P(O)(OR)$_2$, carboxyl group, amino group, carbamoyl group, or the salts thereof, phenolic hydroxide group salts, polyethylene glycol ether group, —C=NH(NH$_2$) salts, or —NHC=NH(NH$_2$) salts (R is an alkyl group or an aryl group.)).

In the above, the hydrazide group compound is preferably a compound expressed by general formula R$^5$CXNHNR$^6$R$^7$ (R$^5$ is an alkyl group or an aryl group; R$^6$ and R$^7$ are hydrogen, an alkyl group, or an aryl group; and X is S or O), general formula R$^5$SO$_2$NHNR$^6$R$^7$ (R$^5$ is an alkyl group or an aryl group; and R$^6$ and R$^7$ are hydrogen, an alkyl group, or an aryl group), or general formula R$^5$NHCXNHNR$^6$R$^7$ (R$^5$ is an alkyl group or an aryl group; R$^6$ and R$^7$ are hydrogen, an alkyl group, or an aryl group; and X is S or O).

In the aforementioned hydrazide group compound, there may be two or more hydrazide structures in the same molecule.

In the compound expressed by the aforementioned general formula (1), Z is preferably a non-metallic atom group necessary to complete a six member ring.

In the compound expressed by the aforementioned general formula (1), X is preferably an oxy radical group.

The compound expressed by the aforementioned general formula (1) preferably comprises 0.05 wt % or more to 10 wt % or less of the ink composition.

The aforementioned hydrazide group compound preferably comprises 0.01 wt % or more to 10 wt % or less of the ink composition.

In the above, the weight ratio of the compound expressed by the aforementioned general formula (1) to the aforementioned hydrazide group compound is preferably 1:25 or more to 5:1 or less (former/latter).

The aforementioned ink composition may also comprise a penetrating agent and/or a moisturizing agent.

According to the aforementioned configuration, it is possible to obtain a recording with superior light resistance as well as superior yellowing resistance because the dimerization and quinone production of the phenol group derivatives can be prevented.

In the aforementioned recording medium of the present invention, it is preferable that the compound expressed by the general formula (1) to be contained is 0.01 wt % or more to 10 wt % or less in relation to the total weight of the aforementioned ink receiving layer in order to sufficiently guarantee the ink absorption characteristics in relation to the recording medium, and to obtain yellowing resistance; and the range of 0.5 wt % or more to 5 wt % or less is more preferable.

In the aforementioned recording medium of the present invention, it is preferable that the hydrazide group compound to be contained is 0.01 wt % or more to 10 wt % or less in relation to the total weight of the aforementioned ink receiving layer in order to sufficiently guarantee the ink absorption characteristics in relation to the recording medium, and to obtain yellowing resistance; and the range of 0.5 wt % or more to 5 wt % or less is more preferable.

In the aforementioned recording medium of the present invention, it is preferable that the weight ratio of the compound expressed by the general formula (1) to be contained to the hydrazide group compound is in the range of 1:25 or more to 5:1 or less; and range of 1:5 to 3:1 or less is more preferable.

According to the aforementioned configuration, it is possible to obtain a recording with superior light resistance as well as superior yellowing resistance because the dimerization and quinone production of the phenol group derivatives can be prevented.

In addition, the inkjet recording method of the present invention records by discharging droplets of the ink composition and allowing the aforementioned droplets to adhere to the recording medium, and is characterized in that the aforementioned ink composition used is the previously described ink composition.

In addition, the inkjet recording method of the present invention records by discharging droplets of the ink composition and allowing the aforementioned droplets to adhere to the recording medium, and is characterized in that the aforementioned recording medium used is the previously described recording medium.

The inkjet recording method of the present invention records by discharging droplets of the ink composition and allowing the aforementioned droplets to adhere to the recording medium, and is characterized in that: the aforementioned recording medium is used as the previously described recording medium; an ink receiving layer is provided on a substrate as the aforementioned recording medium, and a recording medium is used in which the related ink receiving layer comprises a hydrazide group compound.

The inkjet recording method of the present invention records by discharging droplets of the ink composition and allowing the aforementioned droplets to adhere to the recording medium, and is characterized in that the aforementioned ink composition comprising colorant, water and a hydrazide group compound is used as the previously described ink composition, and the aforementioned recording medium is used as the previously described recording medium.

Further, as a result of painstaking studies of these inventions, the present inventors discovered that a recording with superior light resistance, anti-clogging characteristics and yellowing resistance can be obtained in the same way if the ink composition comprises the compound expressed by the previously described general formula (1), and if the recording medium comprises a hydrazide group compound.

Specifically, the inkjet recording method of the present invention is one in which the ink composition comprises a colorant, water, and compound expressed by the general formula (1); and the recording medium comprises a hydrazide group compound.

The ink composition used in the aforementioned recording method of the present invention is made to comprise a colorant, water, and a compound expressed by the general formula (1).

The inkjet recording method of the present invention records by discharging droplets of the ink composition and allowing the aforementioned droplets to adhere to the recording medium, and is characterized in that the aforementioned ink composition comprising colorant, water and a compound expressed by the general formula (1) is used as the previously described ink composition, and the aforementioned recording medium is used as the previously described recording medium.

In the aforementioned recording method of the present invention, in order to have sufficient light resistance as well as satisfactory anti-clogging characteristics, it preferable to have the amount of compound expressed by the general formula (1) contained be 0.05 wt % or more to 10 wt % or less in relation to the total amount of ink, and it is more preferable to be in a range of 0.5 wt % or more to 5 wt % or less. Moreover, it is preferable to have the amount of hydrazide group compound contained be 0.01 wt % or more to 10 wt % or less.

The recording medium used in the aforementioned recording method of the present invention is a recording medium wherein an ink receiving layer is provided on a substrate, and a hydrazide group compound is contained in the previously described ink receiving layer.

In the aforementioned recording medium of the present invention, it is preferable that the compound expressed by the general formula (1) to be contained is 0.01 wt % or more to 10 wt % or less in relation to the total weight of the aforementioned ink receiving layer in order to sufficiently guarantee the ink absorption characteristics in relation to the recording medium, and to obtain yellowing resistance; and the range of 0.5 wt % or more to 5 wt % or less is more preferable.

By using these recording methods, it is possible to obtain a recording with superior light resistance and yellowing resistance.

DESCRIPTION OF THE PREFERRED EMBODIMENTS

Preferred embodiments of the ink composition of the present invention will be explained below.

The ink composition based on the present invention comprises a colorant, water, a compound expressed by the general formula (1) below, and a hydrazide group compound.

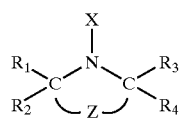

(1)

(In formula (1), X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring. Here, any two groups among $R^1$ to $R^4$ and Z may form a 5 to 7 member ring by mutual bonding.)

The compound expressed by the general formula (1) is a compound expressed by the general formula below that has a water soluble group W.

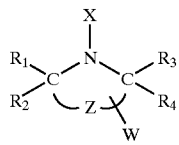

(In the formula, W expresses a hydroxide group, —SO$_3$H group, sulfate ester group, —P(O)(OH)(OR), —P(O)(OR)$_2$, carboxyl group, amino group, carbamoyl group, or the salts thereof, phenolic hydroxide group salts, polyethylene glycol ether group, —C=NH(NH$_2$) salts, or —NHC=NH(NH$_2$) salts (R is an alkyl group or an aryl group.)). Moreover, X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring. Here, any two groups among $R^1$ to $R^4$ and Z may form a 5 to 7 member ring by mutual bonding.)

In general formula (1), methyl group, ethyl group, n-propyl group, isopropyl group, n-butyl group, t-butyl group, n-octyl group, benzyl group, and hexadecyl group may be cited as examples of an alkyl group expressed by X; aryl group and oleyl group may be cited as examples of an alkenyl group; ethynyl group may be cited as an example of an alkynyl group; phenyl group and naphthyl group may be cited as examples of an aryl group; acetyl group, benzoyl group, and pentanoyl group may be cited as examples of an acyl group; methane sulfonyl group, benzene sulfonyl group, and toluene sulfonyl group may be cited as examples of a sulfonyl group; methane sulfinyl group, and benzene sulfinyl may be cited as examples of a sulfinyl group; methyloxy group, ethyloxy group, i-propyloxy group, n-butyloxy group, cyclohexyloxy group, n-octyloxy group, 1-octyloxy group, and benyloxy group may be cited as examples of an alkoxy group; phenoxy group may be cited as an example of an aryloxy group; and acetyloxy group and benzoyloxy group may be cited as examples of an acyloxy group. Any of these groups may have substituent groups, and sulfonyl group, carboxyl group, and hydroxy group may be cited as examples of such substituent groups. In particular, X is preferably an oxy radical group.

$R^1$, $R^2$, $R^3$, and $R^4$ in aforementioned general formula (1) express hydrogen or alkyl groups as previously described. This alkyl group is selected from the same categories as the aforementioned alkyl groups expressed by X. In particular, methyl groups are preferable.

In the aforementioned compound expressed by general formula (1), Z is preferably a non-metallic atom group necessary in order to complete a six member ring.

Specific examples of compounds expressed general formula (1) are indicated below.

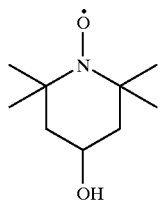

(1-1)

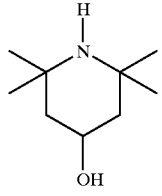

(1-2)

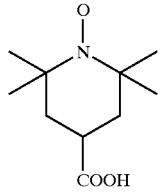

(1-3)

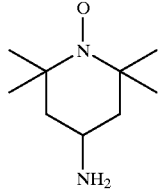

(1-4)

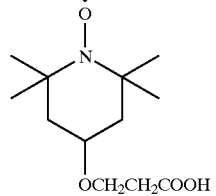

(1-5)

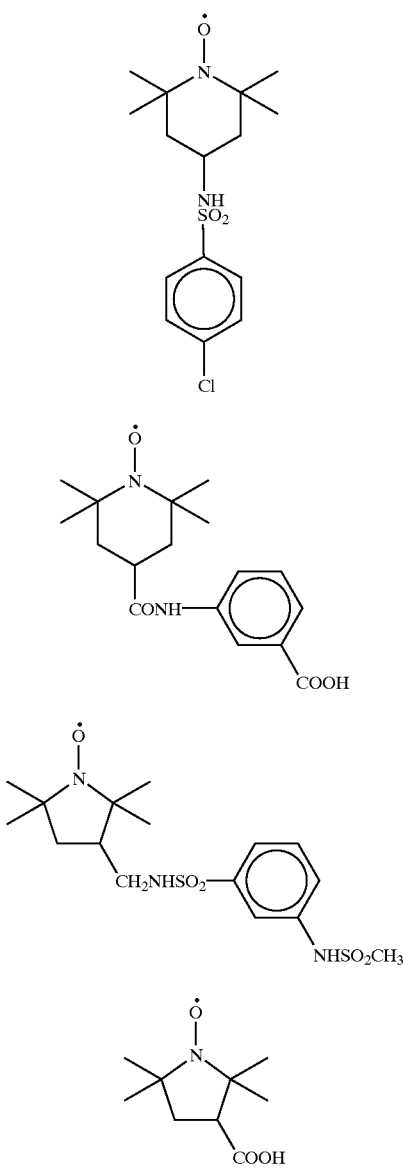

(1-6)

(1-7)

(1-8)

(1-9)

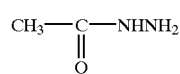

(3-1)

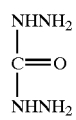

(3-3)

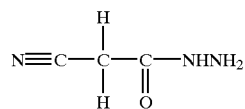

(3-5)

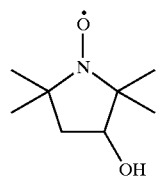

(1-10)

The compound expressed by general formula (1) preferably comprises 0.05 wt % or more to 10 wt % or less of the ink composition; and in particular, it is more preferable to comprise 0.1 wt % or more to 5 wt % or less.

Hydrazide (acyl hydrazide), thiocarbohydrazide, and derivatives thereof may be cited as examples of hydrazide group compounds.

Specifically, it is preferable to use a compound expressed by general formula $R^5CXNHNR^6R^7$ ($R^5$ is an alkyl group or an aryl group; $R^6$ and $R^7$ are hydrogen, an alkyl group, or an aryl group; and X is S or O), general formula $R^5SO_2NHNR^6R^7$ ($R^5$ is an alkyl group or an aryl group; and $R^6$ and $R^7$ are hydrogen, an alkyl group, or an aryl group), or general formula $R^5NHCXNHNR^6R^7$ ($R^5$ is an alkyl group or an aryl group; $R^6$ and $R^7$ are hydrogen, an alkyl group, or an aryl group; and X is S or O).

Further, if a hydrazide group compound has two or more hydrazide structures in the same molecule, the yellowing resistance of the recording is notably superior.

Specific examples of compounds expressed general formula $R^5CXNHNR^6R^7$, general formula $R^5SO_2NHNR^6R^7$, or general formula $R^5NHCXNHNR^6R^7$ are indicated below.

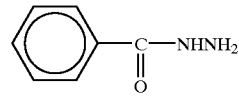

(3-2)

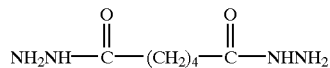

(3-4)

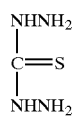

(3-6)

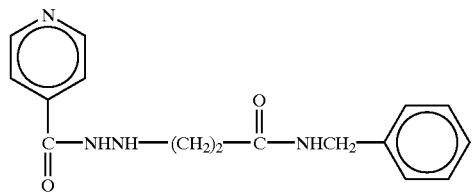 (3-7)

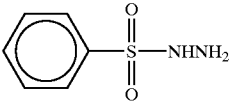 (3-8)

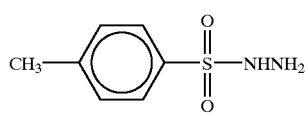 (3-9)

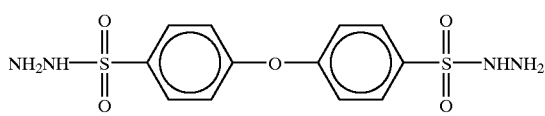 (3-10)

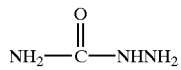 (3-11)

 (3-12)

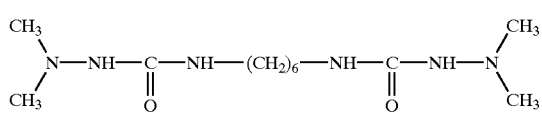 (3-13)

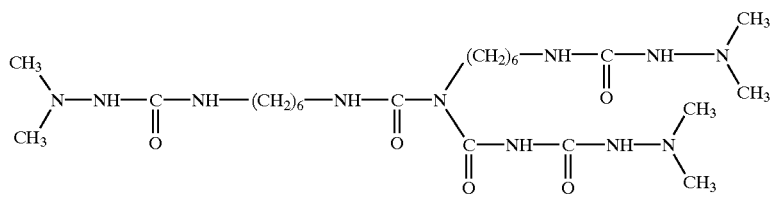 (3-14)

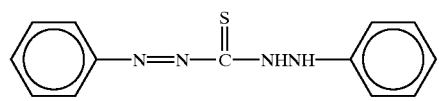 (3-15)

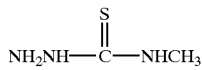 (3-16)

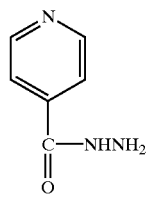 (3-17)

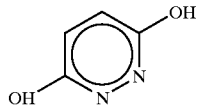 (3-18)

It is preferable that the hydrazide group compound comprise 0.01 wt % or more to 10 wt % or less of the ink composition, and in particular, 0.1 wt % or more to 5 wt % or les is more preferable. The yellowing resistance of the recording can be notable improved by using the preferred content.

In the present invention, the weight ratio of the compound expressed by the aforementioned general formula (1) to the aforementioned hydrazide group compound is preferably 1:25 or more to 5:1 or less(former/latter), and in particular, 1:5 or more to 3:1 or less is more preferable. The yellowing resistance of the recording can be notably improved by using the preferred weight ratio.

Dyes and pigments may be used as colorants.

Water-soluble dyes are preferable, specifically, the dyes categorized as acid dyes, direct dyes, catalyst dyes, reaction dyes, soluble vat dyes, sulfide dyes and food dyes in the Color Index may be cited. Moreover, there are many dyes that are not listed in the Color Index that may be suitably used.

Specific examples of these include: C.I. direct black 17, 19, 32, 38, 51, 62, 71, 74, 75, 112, 117, 154, 163, 168, C.I. acid black 7, 24, 26, 48, 52, 58, 60, 107, 109, 118, 119, 131, 140, 155, 156, 187, C.I. food black 1, 2, C.I. reactive black 5, C.I. direct yellow 11, 28, 33, 39, 44, 58, 86, 100, 132, 142, 330, C.I. acid yellow 3, 19, 23, 25, 29, 38, 49, 59, 62, 72, C.I. basic yellow 11, 51, C.I. disperse yellow 3, 5, C.I. reactive yellow 2, C.I. direct red 23, 79, 80, 83, 99, 220, 224, 227, C.I. acid red 1, 8, 17, 18, 32, 35, 37, 42, 52, 57, 92, 115, 119, 131, 133, 134, 154, 186, 249, 254, 256, C.I. basic red 14, 39, C.I. disperse red 60, C.I. direct blue 6, 8, 15, 25, 71, 76, 80, 86, 90, 106, 108, 123, 163, 165, 168, 199, 226, C.I. acid blue 9, 29, 40, 62, 74, 102, 104, 113, 117, 120, 175, 183, C.I. basic blue 41, C.I. reactive blue 15, C.I. direct violet 47, 51, 90, 94, C.I. acid violet 11, 34, 75.

Pigments are not particularly limited, and either inorganic or organic pigments may be used. In addition to titanium oxide and ferrous oxide, carbon black produced by such well-known methods as the contact, furnace and thermal methods may be used as inorganic pigments. Azo dyes (including azo lake, insoluble azo pigment, condensed azo pigment, and chelate azo pigment), multi-ring type pigment (for example, phthalocyanine pigment, perylene pigment, perynone pigment, anthraquinone pigment, quinacridone pigment, dioxydine pigment, thioindigo pigment, isoindolinone pigment, and quinophthalone pigment), dye chelate (for example, basic dye-type chelate, acid dye-type chelate, etc.) nitro pigment, nitrone pigment, and aniline black may be used as organic pigment.

In particular, No. 2300, No. 900, MCF88, No. 33, No. 40, No. 45, No. 52, MA7, MA8, MA100, No2200B manufactured by Mitsubishi Chemicals; Raven 5750, Raven 5250, Raven 5000, Raven 3500, Raven 1255, Raven 700 manufactured by Columbia Co.; Regal 400R, Regal 330R, Regal 1660R, Mogul L, Monarch 700, Monarch 800, Monarch 880, Monarch 900, Monarch 1000, Monarch 1100, Monarch 1300, Monarch 1400 manufactured by Cavott Co.; Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 manufactured by Degussa Co. may be utilized as the carbon black used in the black ink.

C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 119, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185 may be cited as pigments used in yellow ink.

C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202 may be cited as pigments used in magenta ink.

C.I. Pigment Blue 1, C.I. Pigment Blue 2, C.I. Pigment Blue 3, C.I. Pigment Blue 15:3, C.I. Pigment Blue 15:34, C.I. Pigment Blue 15:4, C.I. Pigment Blue 16, C.I. Pigment Blue 22, C.I. Pigment Blue 60, C.I. Vat Blue 4, C.I. Vat Blue 60 may be cited as pigments used in cyan ink.

0.1 wt % or more to 20 wt % or less is the preferable amount of colorant to add into the ink composition, and 0.5 wt % or more to 10 wt % or less is more preferable. Moreover, when using pigment, a particle size of 10 $\mu$m or less is preferable, and 0.1 $\mu$m or less is more preferable.

Water is used as the solvent in the ink composition of the present invention. Any of ion-exchanged water, ultra-filtered water, reverse osmosis water, purified water such as distilled water, or ultra-purified water may be preferably used as the water.

The ink composition of the present invention may comprise a penetrating agent and/or a moisturizing agent.

Compounds that lower the surface tension of the ink, that promote penetration of the ink into the recording medium, and that can shorten the drying time may be broadly used as penetrating agents. For example, low-class alcohols such as ethanol, propanol, isopropanol, butanol, pentanol; cellosolves such as ethylene glycol monoethyl ether, and ethylene glycol monobutyl ether; and carbitos such as diethylene glycol monobutyl ether, triethylene glycol monobutyl ether, and glycol ether; and non-ionic surfactants may be cited.

Compounds that preserve ink moisture by suppressing the evaporation of water and that can improve discharge stability may be broadly used as moisturizing agents. For example, polyvalent alcohols such as ethylene glycol, propylene glycol, diethylene glycol, triethylene glycol, polyethylene glycol, polypropylene glycol, glycerin, diglycerin, 1,3-propane diol, and 1,5-penthane diol; sugars such as multitol, maltose, and sorbitol; glycerin derivatives such as trimethylol ethane, and trimethylol propane; carbonate esters such as ethylene carbonate; imidazol derivatives such as imidazol, and 2-methyl imidazol; and pyridinol derivatives such as 2-pyridinol, and 3-pyridinol; and urea may be cited.

The ink composition of the present invention may comprise auxiliaries generally used in inks for inkjet recording as necessary. pH adjusters, chelate agents, preservatives, and anti-rust agents may be cited as these kinds of generally used auxiliaries.

According to the above configuration, recording with superior light resistance, anti-clogging characteristics, and yellowing resistance can be obtained because dimerization and quinone production of the phenol group derivatives can be prevented.

In addition to an ink composition, the compound expressed by general form (1) and the hydrazide compound of the present invention are effectively used as an endowing solution when printing on recording media. In this situation, it is desirable for an endowing solution to omit pigment, and to produce within the same rages as those of the previously described configuration of the in ink composition.

Next, preferred embodiments of a recording medium based on the present invention will be explained.

Ink receiving layers can reproduce color images and photographic images with high image quality, and there are well-known ink receiving layers that are configured at least from ink-absorbing pigment, ink fixatives, and binders. However, the ink receiving layer of the recording medium based on the present invention further contains a compound expressed by general formula (1), and a hydrazine group compound.

It is preferable to use the same items as those used in the previously described ink composition respectively for the compound expressed by general formula (1) and the hydrazide group compound.

The compound expressed by general formula (1) preferably comprises 0.01 wt % or more to 10 wt % or less of the total dried weight of the ink receiving layer; and in particular, it is more preferable to comprise 0.1 wt % or more to 5 wt % or less.

The hydrazide group compound preferably comprises 0.01 wt % or more to 10 wt % or less of the total dry weight of the ink composition, and in particular, 0.1 wt % or more to 5 wt % or less is more preferable.

In the present invention, the weight ratio of the compound expressed by the aforementioned general formula (1) to the aforementioned hydrazide group compound is preferably 1:25 or more to 5:1 or less(former/latter), and in particular, 1:5 or more to 3:1 or less is more preferable. The yellowing resistance of the recording can be notably improved by using the preferred weight range.

One or more types of well-known ink-absorbing pigment may be used, and silicas such as synthetic non-crystalline silica and colloidal silica, as well as colloidal alumina may be cited as examples.

In addition to silica and alumina, white inorganic pigments such as light calcium carbonate, heavy calcium carbonate, magnesium carbonate, kaolin, talc, calcium sulfate, barium sulfate, titanium dioxide, zinc oxide, zinc sulfide, zinc carbonate, titanium white, aluminum silicate, diatomaceous earth, calcium silicate, magnesium silicate, pseudo-boehmite, aluminum hydroxide, magnesium hydroxide, lithopane, zeolite, hydrated halloysite, as well as organic pigments such as styrene group plastic pigments, acryl group plastic pigments, polyethylene, melamine resins, and urea resins may be cited as white pigments.

These ink-absorbing pigments preferably comprise 30 wt % or more to 90 wt % or less of the total dry weight of the ink receiving layer, and in particular 40 wt % or more to 80 wt % or less is more preferable.

Cationic compounds are preferable as ink-fixing agents, and low molecular compounds having a class 1 to 3 amine or class 4 ammonium base, oligopolymers having these as a base, or polymers having these as a base may be cited as examples. Such diaryl-dimethyl ammonium salt polymers as diaryl-dimethyl ammonium chloride polymers, diaryl-dimethyl ammonium chloride—sulfur dioxide copolymers, and diaryl-dimethyl ammonium chloride—acrylamide copolymers; diarylamine hydrochloride—sulfur dioxide copolymer, diaryl methylamine hydrochloride copolymer, polyarylamine, polyethyleneimine, polyethyleneimine class 4 ammonium salt compounds, alkyl ammonium salt(meth) acrylate polymer, alkyl ammonium salt(meth)acrylamide polymer, ions of class 4 ammonium salts, and polyalkylene amine dicyandiamide ammonium salt may be cited as specific examples.

These ink-fixing agents preferably comprise 1 wt % or more to 30 wt % or less of the total dry weight of the ink receiving layer, and in particular 5 wt % or more to 10 wt % or less is more preferable.

Starch derivatives such as starch oxide, etherified starch, and phosphate esterified starch; cellulose derivatives such as carboxymethyl cellulose, and hydroxyethyl cellulose; casein; gelatin; soy bean protein; polyvinyl alcohol or derivatives thereof; polyvinyl pyrrolidone; maleic anhydride resin; styrene-butadiene copolymer; conjugated diene group copolymer latex such as methyl methacrylate—butadiene copolymer; acryl group copolymer latex such as a copolymer or an acryl group polymer of the copolymer of ester acrylate and ester methacrylate; vinyl group polymer latex such as ethylene acetate vinyl copolymer; function group denatured polymer latex based on a monomer containing a functional group such as a carboxyl group of various polymers of the above latexes; aqueous adhesive such as thermoset resins like melamine resins and urea resins; acrylic esters such as polymethyl methacrylate or the like; polymers or copolymers of methacrylate esters; polyurethane resin, unsaturated polyester resin; vinyl chloride—vinyl acetate copolymer, polyvinyl butylal; and synthetic resin group adhesives such as alkyd resin may be cited as binders.

These binders preferably comprise 10 wt % or more to 60 wt % or less of the total dry weight of the ink receiving layer, and in particular 20 wt % or more to 50 wt % or less is more preferable.

The ink receiving layer may contain various widely known additives as necessary such as dye fixing agents (anti-hydrating agents), fluorescent brighteners, surfactants, defoaming agents, pH adjusters, anti-mold agents, ultraviolet ray absorbing agents, and anti-oxidants.

The configuration of the ink receiving layer has been explained above, but assuming that the main configurational components of the ink receiving layer is silica or alumina, the percentage of void of the ink receiving layer should preferably be made 30% or more to 80% or less by adjusting the particle size of the silica or alumina and the amount of the other configurational components contained. In particular, the absorption characteristics can be reliably guaranteed in relation to the ink recording medium by making the percentage of void 30% or over, and reliable strength can given to the ink receiving layer by making the percentage of void 80% or less.

Paper or sheet-shaped plastic maybe used as the substrate, and either light transmissive or non-transmissive substrate may be used.

Conventional, well-known substrate may be used. Specifically, pulp source material such wood pulp or non-wood pulp mainly containing natural cellulose fiber may be cited as paper; and polyester group resin, diacetate group resin, triacetate group resin, acryl group resin, polycarbonate group resin, polyvinyl chloride group resin, polyimide group resin, cellophane, and celluloid may be cited as plastic materials.

The recording medium of the present invention may be suitably obtained by using a well-known coating method such as rolling, spraying, rod barring, or air knifing to coat on the aforementioned substrate and then dry a coating solution, in which the aforementioned configurational components are dissolved or dispersed in a suitable solvent such as water. Generally, a drier can be used for drying after the coating process, and drying is generally conducted in the range of 100° C. to 150° C. With the above configuration, a recording with superior image storage characteristics, light resistance, and yellowing resistance can be obtained.

The inkjet recording method of the present invention will be explained next. With the inkjet recording method of the present invention, it is possible for the compound of general formula (1) and the hydrazide group compound to be suitably co-present in the recording by conducting inkjet recording using the aforementioned ink composition and/or recording medium. A recording superior in light resistance and yellowing resistance can be obtained thereby.

Further, with the inkjet recording method of the present invention, it is possible to obtain a recording having sufficient light resistance and superior in yellowing resistance even when the ink composition comprises colorant, water, and the compound expressed by general formula (1), and the recording medium comprises a hydrazide group compound.

EXAMPLES

Next, the present invention will be explained in further detail using examples, but the present invention is not limited in any way by these examples.

Preparation of Ink Composition

Various ink compositions were obtained by agitating the components having the compositions indicated in Table 1 for 30 minutes at room temperature, and then filtering with a 1-$\mu$m membrane filter.

TABLE 1

|  | Ink composition No. | | | | | | | | |
|---|---|---|---|---|---|---|---|---|---|
|  | 1 | 2 | 3 | 4 | 5 | 6 | 7 | 8 | 9 |
| Colorant | | | | | | | | | |
| C.I. Direct red 249 | 3 |  |  | 2 |  | 3 |  | 3 |  |
| C.I. Direct yellow 132 |  | 4 |  |  | 3 |  | 4 |  |  |
| C.I. Direct yellow 86 |  |  | 2.5 |  |  |  |  |  | 2.5 |

TABLE 1-continued

| | Ink composition No. | | | | | | | | |
|---|---|---|---|---|---|---|---|---|---|
| | 1 | 2 | 3 | 4 | 5 | 6 | 7 | 8 | 9 |
| Compound expressed by general formula (1) | | | | | | | | | |
| Compound of formula (1-1) | 0.5 | 0.1 | | | | | 0.5 | 0.1 | |
| Compound of formula (1-2) | | | 0.4 | 8 | 4 | | | | |
| Hydrazide group compound | | | | | | | | | |
| Compound of formula (3-3) | 2 | | | | 10 | | | | |
| Compound of formula (3-4) | | 2 | | | | | | | |
| Compound of formula (3-11) | | | 0.1 | | | | | | 0.1 |
| Compound of formula (3-13) | | | | 4 | | | | | |
| Penetrating agent, etc. | | | | | | | | | |
| Glycerin | 13 | | | 2 | 8 | 13 | | 13 | |
| Triethylene glycol | | 30 | | 10 | 2 | | 30 | | |
| 1,5-pentadiol | | | 4 | | | | | | 4 |
| Ethylene glycol | | | 14 | | | | | | 14 |
| Olfine E1010 (Manufactured by Nissin Chemical Industry Co.) | 1 | 2 | | | 1 | 1 | 2 | 1 | |
| Olfine STG (Manufactured by Nissin Chemical Industry Co.) | | | 1 | 0.5 | | | | | 1 |
| Diethylene glycol monobutyl ether | 10 | | | | 9 | 10 | | 10 | |
| Triethylene glycol monobutyl ether | | 8 | | 10 | | | 8 | | |
| Propylene glycol monomethyl ether | | | 5 | | | | | | 5 |
| Preservative | | | | | | | | | |
| Proxel XL-2 (Manufactured by AVECIA Co.) | 0.3 | 0.3 | 0.3 | 0.3 | 0.3 | 0.3 | 0.3 | 0.3 | 0.3 |
| Water | | | | | Remaining amount | | | | |

Units: wt %

Light Resistance Tests

Using an inkjet printer, PM800C (manufactured by Seiko Epson Co., Ltd.), the above ink compositions were respectively loaded into custom cartridges, and printing was conducted on custom inkjet recording media (Premium Glossy Photo Paper, manufactured by Seiko Epson Co., Ltd.). After allowing to stand for 1 day at room temperature and ambient humidity without direct exposure to light, the light resistance of the recordings obtained were assess under the following conditions.

First, light irradiation was conducted using a xenon weatherometer Ci5000 (manufactured by ATLAS Co.), and the prints were exposed to black panel 35° C., 60% relative humidity, and 0.18 W/m$^2$ irradiation of 340 nm UV light. The irradiation conditions were 180 kJ/m$^2$ (278 hours light irradiation under the above conditions), or 360 kJ/m$^2$ (556 hours light irradiation under the above conditions).

After irradiation, the reflection concentrations of the various color components of the recordings were measured using a spectrophotometer, GRETAGSPM (manufactured by GRETAG Co.). The conditions at this time were: light source D50; no light source filter; a with standard of absolute white; and a 2° angle of field. The concentration residual percentage was assessed with the following standards.

Assessment A: exceeds 90% of initial value
Assessment B: 80% or more to less than 90% of initial value
Assessment C: less than 80% of initial value Standing Clogging Tests After loading the ink cartridge filled with ink composition into previously described printer and confirming that the initial ink composition discharged in a normal manner, the power to the printer was turned off, the printer with the loaded ink cartridge was left to stand as in an environment of temperature 40° C., humidity 20% RH for 1 to 12 months. After allowing to stand for the specified time, the printer was moved to normal environmental conditions, and the power was turned on after waiting for the temperature of the main unit to drop to normal. Printing was conducted again, and the number of recovery operations required until the same print quality could be obtained as before was investigated. The assessments were conducted using the following standards.

Assessment A: Print quality equivalent to the initial levels was obtained in 0 to 2 recovery operations.
Assessment B: Print quality equivalent to the initial levels was obtained in 3 to 5 recovery operations.
Assessment C: Print quality equivalent to the initial levels was not obtained in 6 or more recovery operations.

Anti-Yellowing Tests

Using the same method as in the light resistance tests, prints on an custom inkjet recording medium (paper for PM copies, manufactured by Seiko Epson Co., Ltd., product name).

Next, the prints obtained were placed in clear files (manufactured by Mitsubishi Pencil Co., Ltd.; product name: Cited Literature-A420), and stored for 3 days to 1 month under conditions of temperature 40° C., humidity 20% RH. After standing for the specified time, the prints were taken from the clear files, and the color changes of the non-printed areas as well as discoloration of and around the printed areas were visually confirmed using the following standards.

Assessment A: No yellowing at all, satisfactory
Assessment B: Slight yellowing is apparent, but not enough to be a problem for image quality
Assessment C: Yellowing of and around the printed Results of Print Assessment Tests The results of the various tests conducted using the aforementioned ink compositions 1 to 9 are indicated in Table 2.

TABLE 2

| | Ink composition No. | | | | | | | | |
|---|---|---|---|---|---|---|---|---|---|
| | 1 | 2 | 3 | 4 | 5 | 6 | 7 | 8 | 9 |
| | Example · Comparative example No. | | | | | | | | |
| | Ex 1 | Ex 2 | Ex 3 | Ex 4 | Ex 5 | C 1 | C 2 | C 3 | C 4 |
| Ratio of compound of general formula (1) and hydrazide group compound | 1:4 | 1:20 | 4:1 | 2:1 | 1:2.5 | — | — | — | — |
| Light resistance test | | | | | | | | | |
| 180 kJ/m$^2$ | A | A | A | A | A | A | A | C | C |
| 360 kJ/m$^2$ | A | B | B | A | A | A | B | C | C |
| Standing clogging test (40° C. 20% RH) | | | | | | | | | |
| 1 month | A | A | A | A | A | A | A | A | A |
| 3 months | A | B | A | A | A | A | B | A | A |
| 6 months | A | B | B | B | A | A | B | A | B |
| 12 months | A | B | B | B | B | A | B | A | B |
| File yellowing test (40° C. 20% RH) | | | | | | | | | |
| 3 days | A | A | B | A | A | B | A | A | A |
| 7 days | A | A | B | B | A | C | B | A | A |

TABLE 2-continued

| | Ink composition No. | | | | | | | | |
|---|---|---|---|---|---|---|---|---|---|
| | 1 | 2 | 3 | 4 | 5 | 6 | 7 | 8 | 9 |
| | Example · Comparative example No. | | | | | | | | |
| | Ex 1 | Ex 2 | Ex 3 | Ex 4 | Ex 5 | C 1 | C 2 | C 3 | C 4 |
| 14 days | B | A | B | B | B | C | B | A | A |
| 28 days | B | B | B | B | B | C | C | A | A |

Ex 1–5: Example 1–5, C 1–4: Comparative example 1–4

As can been understood from Table 2, examples 1 to 5, which used ink compositions containing the compound expressed by general formula (1) and hydrazide group compound, obtained fully satisfactory results in all tests. This contrasts to comparative examples 1 to 4, which could not satisfy all the light resistance, anti-clogging, and anti-file yellowing characteristics.

Preparation of Recording Medium

High quality 100 g/m² weight paper was used as the substrate, and coating solution obtained by mixing water and the ink receiving layer components (weight of the components of the ink receiving layer:weight of water=20:80) indicated in Table 3 was coated on this high quality paper at 15 g/m². After coating, the intermediate layers were dried for 2 minutes at 130° C. using a drier, and thus recording media a to e were prepared.

TABLE 3

| | Recording medium | | | | |
|---|---|---|---|---|---|
| | a | b | c | d | e |
| Compound expressed by general formula 1 Compound of formula (1-1) | 0.5 | 4 | | | |
| Hydrazide group compound Compound of formula (2-3) | 0.5 | 4 | 1 | 4 | |
| Ink-absorbing pigment Silica gel P78D (Product name of Mizusawa Industrial Chemicals Co., Ltd.) | | | 60 | | |
| Ink fixing reagent Diarylmethyl ammonium chloride-sulfur dioxide | | | 9 | | |

TABLE 3-continued

| | Recording medium | | | | |
|---|---|---|---|---|---|
| | a | b | c | d | e |
| polymer-PAS-A (Product name of Nitto Boseki Co., Ltd.) | | | | | |
| Binder Polyvinyl alcohol CM318 (Polymerization 1800) (Product name of Kuraray Co., Ltd.) | Remaining amount | | | | |

Units: wt %

Results of Print Assessment Tests

Printing was conducted by combining the various ink compositions and recording media above as indicated in Table 4, and light resistance and anti-yellowing tests were conducted using the same methods as above. The results of the tests are indicated in Table 4.

TABLE 4

| Ink composition No. | 1 | | | 6 | | | 8 | | | 9 | | |
|---|---|---|---|---|---|---|---|---|---|---|---|---|
| Recording medium | a | b | c | a | b | c | a | b | c | a | b | c |
| Example · Comparative example No. | Ex 6 | Ex 7 | Ex 8 | Ex 9 | Ex 10 | C 5 | Ex 11 | C 6 | C 7 | Ex 12 | C 8 | C 9 |
| Light resistance tests | | | | | | | | | | | | |
| 180 kJ/m² | A | A | A | A | A | A | A | C | C | A | C | C |
| 360 kJ/m² | B | B | B | B | B | B | A | C | C | A | C | C |
| File yellowing test (40° C. 20% RH) | | | | | | | | | | | | |
| 3 days | A | A | A | A | A | B | A | A | A | A | A | A |
| 7 days | A | A | A | B | A | B | A | A | A | A | A | A |
| 14 days | A | A | A | B | A | C | B | A | A | B | A | A |
| 28 days | B | A | A | B | B | C | B | A | A | B | A | A |

Ex 6–12: Example 6–12, C 5–9: Comparative example 5–9

As can been understood from Table 4, examples 6 to 12 obtained fully satisfactory results in all tests. This contrasts to comparative examples 5 to 9, which could not satisfy all the light resistance, anti-clogging, and anti-file yellowing characteristics.

INDUSTRIAL APPLICABILITY

Based on the ink composition, recording medium, inkjet recording method, and recording of the present invention, it is possible to have recordings with superior light resistance, to have no clogging, and to obtain a recording with high quality images that have superior yellowing resistance.

Moreover, a recorded image of a recording of the present invention has superior light resistance and yellowing resistance.

What is claimed is:

1. An ink composition comprising a colorant, water, a compound expressed by the general formula (1) below, and a hydrazide group compound

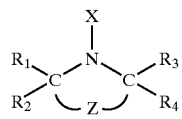
(1)

wherein X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring, wherein the hydrazide group compound is a compound expressed by one of the following general formulae (a), (b) or (c): (a) general formula $R^5CXNHNR^6R^7$, wherein $R^5$ is an alkyl group or an aryl group; $R^6$ and $R^7$ are hydrogen, an alkyl group, or an aryl group; and X is S or O or (b) general formula $R^5SO_2NHNR^6R^7$, wherein $R^5$ is an alkyl group or an aryl group; and $R^6$ and $R^7$ are hydrogen, an alkyl group, or an aryl group, or (c) general formula $R^5NHCXNBNR^6R^7$ wherein $R^5$ is an alkyl group or an aryl group; $R^6$ and $R^7$ are hydrogen, an alkyl group, or an aryl group; and X is S or O.

2. An ink composition described in claim 1 wherein said compound expressed by the general formula (1) is a compound expressed by the general formula below having water soluble group W

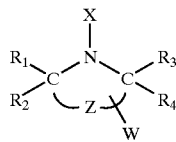

wherein W expresses a hydroxyl group, —$SO_3H$ group, sulfate ester group, —P(O)(OH)(OR), —P(Q)(OR)$_2$, carboxyl group, amino group, carbamoyl group, or the salts thereof, phenolic hydroxyl group salts, polyethylene glycol ether group, —C=HH(NH$_2$) salts, or —NHC=NH(NH$_2$) salts wherein R is an alkyl group or an aryl group, X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring.

3. An ink composition described in claim 1 wherein said hydrazide group compound has two or more hydrazide structures in the same molecule.

4. An ink composition described in claim 1 wherein Z in the compound expressed by the general formula (1) is a non-metallic atom group necessary to complete a six member ring.

5. An ink composition described in claim 1, wherein X in the compound expressed by the general formula (1) is an oxy radical group.

6. An ink composition described in claim 1 wherein the compound expressed by the general formula (1) comprises no less than 0.05 wt % and not more than 10 wt % of the ink composition.

7. An ink composition described in claim 1 wherein said hydrazide group compound comprises not less than 0.01 wt % and not more than 10 wt % of the ink composition.

8. An ink composition described in claim 1 wherein the weight ratio of the compound expressed by the general formula (1) to said hydrazide group compound is not less than 1:25 and not more than 5:1.

9. An ink composition described in claim 1 further comprising a penetrating agent and/or a moisturizing agent.

10. A recording medium having an ink receiving layer formed on a substrate wherein said ink receiving layer comprises a compound expressed by the general formula (1) below and a hydrazide group compound

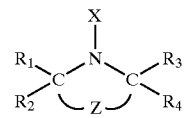
(1)

wherein X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring, and wherein the hydrazide group compound is a compound expressed by one of the following general formulae (a), (b) or (c): (a) general formula $R^5CXNHNR^6R^7$, wherein $R^5$ is an alkyl group or an aryl group; $R^6$ and $R^7$ are hydrogen, an alkyl group, or an aryl group; and X is S or O or (b) general formula $R^5SO_2NHNR^6R^7$ wherein $R^5$ is an alkyl group or an aryl group; and $R^6$ and $R^7$ are hydrogen, an alkyl group, or an aryl group, or (c) general formula $R^5NHCXNHNR^6R^7$ wherein $R^5$ is an alkyl group or an aryl group; $R^6$ and $R^7$ are hydrogen, an alkyl group, or an aryl group; and X is S or O.

11. A recording medium described in claim 10 wherein said compound expressed by general formula (1) comprises not less than 0.01 wt % and not more than 10 wt % of the total amount of the ink receiving layer.

12. A recording medium described in claim 10 wherein said hydrazide group compound comprises not less than 0.01 wt % and not more than 10 wt % of the total amount of the ink receiving layer.

13. A recording medium described in claim 10 wherein the weight ratio of the compound expressed by the general formula (1) to the hydrazide group compound is in the range of 1:25 to and 5:1 inclusive.

14. An inkjet recording method that records on a recording medium by discharging droplets of the ink composition of claim 1 and allowing said droplets to adhere to the recording medium.

15. An inkjet recording method comprising recording on the recording medium of claim 10 by discharging droplets of an ink composition and allowing said droplets to adhere to the recording medium.

16. An inkjet recording method comprising recording on a recording medium by discharging droplets of the ink composition of claim 1 and allowing said droplets to adhere to the recording medium, the recording medium having an ink receiving layer formed on a substrate wherein said ink receiving layer comprises a compound expressed by the general formula (1) and a hydrazide group compound of general formula (a), (b) or (c).

17. An inkjet recording method comprising recording on a recording medium by discharging droplets of the ink composition of claim 1 and allowing said droplets to adhere to the recording medium, wherein the recording medium comprises an ink receiving layer provided on a substrate, wherein the ink receiving layer comprises a compound of the formula (1), a the hydrazide group compound of general formula (a), (b) or (c) and a tertiary amine group compound.

18. An inkjet recording method comprising recording on the recording medium of claim 10 discharging droplets of an ink composition and allowing said droplets to adhere to the recording medium wherein the ink composition comprises a compound of formula (1), a colorant, water, and a hydrazide group compound of general formula (a), (b) or (c).

19. An inkjet recording method comprising recording on a recording medium by discharging droplets of an ink composition and allowing said droplets to adhere to the recording medium, wherein the ink composition comprises a colorant, water, a hydrazide group compound and a compound expressed by general formula (1) below and the recording medium comprises an ink receiving layer provided on a substrate, wherein the ink receiving layer comprises a compound of the formula (1), a hydrazide group compound and a tertiary amine group compound;

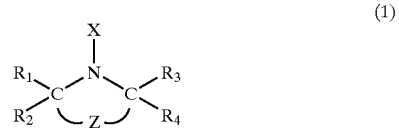
(1)

wherein X is hydrogen, an oxy radical group, hydroxyl group, alkyl group, alkenyl group, alkylnyl group, aryl group, acyl group, sulfonyl group, sufinyl group, alkoxy group, aryloxy group, or acyloxy group; $R^1$, $R^2$, $R^3$, and $R^4$ are hydrogen or an alkyl group respectively; and Z is a non-metallic atom group necessary in order to complete a 5 to 7 member ring, wherein each of the hydrazide group compound contained in the ink composition and the hydrazide group compound contained in the ink receiving layer is a compound expressed by (a) general formula $R^5CXNHNR^6R^7$, wherein $R^5$ is an alkyl group or an aryl group; $R^6$ and $R^7$ are hydrogen, an alkyl group, or an aryl group; and X is S or O or (b) general formula $R^5SO_2NHNR^6R^7$ wherein $R^5$ is an alkyl group or an aryl group; and $R^6$ and $R^7$ are hydrogen, an alkyl group, or an aryl group, or (c) general formula $R^5NHCXNHNR^6R^7$ wherein $R^5$ is an alkyl group or an aryl group; $R^6$ and $R^7$ are hydrogen, an alkyl group, or an aryl group; and X is S or O.

20. An inkjet recording method comprising recording on the recording medium of claim 10 by discharging droplets of an ink composition and allowing said droplets to adhere to the recording medium, wherein the ink composition comprises a colorant, water, a hydrazide group compound of general formula (a), (b), or (c) and the compound expressed by general formula (1).

21. An inkjet recording method described in claim 19 wherein the amount of the compound expressed by general formula (1) contained in the ink composition is 0.05 wt % or more to 10 wt % or less of the ink composition.

22. An inkjet recording method described in claim 18 wherein the amount of the hydrazide compound contained in the ink composition is not less than 0.01 wt % and not more than 10 wt % of said ink composition.

23. An inkjet recording method described in claim 17 wherein the amount of the hydrazide compound contained in the recording medium is not more than 0.01 wt % and not less than 10 wt % of said recording medium.

24. A recording recorded by the inkjet recording method described in claim 14.

25. An ink composition described in claim 1 wherein any two groups among $R^1$ to $R^4$ and Z forms a 5 to 7 member fling by mutual bonding.

26. An ink composition described in claim 2 wherein any two groups among $R^1$ to $R^4$ and Z forms a 5 to 7 member ring by mutual bonding.

27. A recording medium described in claim 10 wherein any two groups among $R^1$ to $R^4$ and Z forms a 5 to 7 member ring by mutual bonding.

28. An inkjet recording method described in claim 19 wherein any two groups among $R^1$ to $R^4$ and Z forms a 5 to 7 member ring by mutual bonding.

29. An inkjet recording method described in claim 20 wherein any two groups among $R^1$ to $R^4$ and Z forms a 5 to 7 member ring by mutual bonding.

30. An ink composition described in claim 1, wherein the hydrazide group compound is a compound of general formula (a).

31. An ink composition described in claim 1, wherein the hydrazide group compound is a compound of general formula (b).

32. An ink composition described in claim 1, wherein the hydrazide group compound is a compound of general formula (c).

33. A recording medium described in claim 10, wherein the hydrazide group compound is a compound of general formula (a).

34. A recording medium described in claim 10, wherein the hydrazide group compound is a compound of general formula (b).

35. A recording medium described in claim 10, wherein the hydrazide group compound is a compound of general formula (c).

* * * * *